(12) United States Patent
Fourie

(10) Patent No.: US 9,604,726 B2
(45) Date of Patent: Mar. 28, 2017

(54) PARACHUTE SYSTEM MOUNTED TO PAYLOAD

(71) Applicant: Google Inc., Mountain View, CA (US)

(72) Inventor: Daniel Fourie, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 133 days.

(21) Appl. No.: 14/665,653

(22) Filed: Mar. 23, 2015

(65) Prior Publication Data

US 2016/0280380 A1 Sep. 29, 2016

(51) Int. Cl.
*B64D 17/62* (2006.01)
*B64B 1/40* (2006.01)
*B64D 17/80* (2006.01)

(52) U.S. Cl.
CPC .............. *B64D 17/62* (2013.01); *B64B 1/40* (2013.01); *B64D 17/80* (2013.01)

(58) Field of Classification Search
CPC ........ B64D 17/60; B64D 17/62; B64D 17/64; B64D 17/70; B64D 17/74; B64D 17/80; B64B 1/40
See application file for complete search history.

(56) References Cited

U.S. PATENT DOCUMENTS

| | | | |
|---|---|---|---|
| 3,227,403 A | 1/1966 | Ferguson | |
| 3,614,031 A * | 10/1971 | Demboski | B64B 1/62 244/138 R |
| 7,530,527 B2 | 5/2009 | Kelleher | |
| 7,801,522 B2 | 9/2010 | Knoblach et al. | |
| 7,844,218 B2 | 11/2010 | Seligsohn et al. | |
| 8,061,647 B1 | 11/2011 | Powell | |
| 8,226,043 B2 * | 7/2012 | Reinhard | B64D 17/025 244/138 R |
| 8,812,176 B1 | 8/2014 | Biffle et al. | |
| 9,010,691 B1 | 4/2015 | Ratner et al. | |
| 2009/0302165 A1 | 12/2009 | Reinhard | |
| 2012/0248241 A1 | 10/2012 | Goelet | |

OTHER PUBLICATIONS

International Searching Authority, International Search Report and Written Opinion mailed on Jun. 20, 2016, issued in connection with International Application No. PCT/US2016/019731, filed on Feb. 26, 2016, 14 pages.
Free Balloon Operations in World War Two, Internet article describing Free Balloons in World War II (circa 1941), 10 pages.

* cited by examiner

*Primary Examiner* — Tien Dinh
*Assistant Examiner* — Richard R Green
(74) *Attorney, Agent, or Firm* — McDonnell Boehnen Hulbert & Berghoff LLP

(57) ABSTRACT

A balloon system is provided including a balloon envelope, a payload secured to the balloon envelope, a first parachute positioned within a parachute container, the parachute container secured to the payload, a first bridle line having a first end secured to the balloon system and a second end secured to the parachute container, a controller positioned on the balloon system, wherein when the controller receives a signal to deploy the parachute container, the controller is operable to cause the parachute container to be released downwardly from the payload.

18 Claims, 10 Drawing Sheets

PARACHUTE SYSTEM MOUNTED TO PAYLOAD

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

The present embodiments provide a parachute system useful for slowing the descent of a balloon envelope and payload, sometimes referred to as an envelope/payload system. The parachute system includes a primary parachute having a very long bridle line that allows for the parachute to be far away from the balloon envelope upon deploying, thereby reducing the possibility of having the bridle line becoming tangled with the envelope/payload system, and increasing the likelihood of a clean deployment. In some embodiments, the bridle line may be on the order of 5-20 times as long as the balloon system length (top of envelope to bottom of payload), or 8-10 times in other embodiments. In addition, a parachute container containing the primary parachute and the bridle line may advantageously be launched downwardly (at an angle of 0-90 degrees from vertical, or 0-45 and 0-60 degrees from vertical in other embodiments) from the payload to allow the parachute to be far from the balloon envelope upon deployment. Alternately, the parachute system may be secured to the payload, ideally on the bottom of the payload, and rather than being launched, the parachute system may simply be dropped from the payload, by releasing the holding strap(s).

In one embodiment, a drogue or pilot parachute is used. In this embodiment, the main bridle line is positioned within the parachute container, and is attached to the parachute container on one end and to the payload or envelope/payload system on the other end. When it has been determined that it is time to launch or drop the parachute container, the parachute container is launched or dropped from the payload. As the parachute container descends, the main bridle line is pulled from the parachute container. The main bridle line may be attached to the drogue or pilot chute near its end. Once the main bridle line has been pulled out of the parachute container, the drogue or pilot chute is pulled from the parachute container and deployed. Other methods could also be used to pull the drogue parachute from the parachute container. The parachute container and main parachute within are suspended beneath the deployed pilot chute by a second bridle line.

As the system velocity of the descending balloon/payload system increases as it loses buoyancy and the cross-sectional drag decreases, the pilot parachute with the main parachute and parachute container suspended below is lifted up as the drag of the pilot parachute and parachute container system becomes greater than the drag of the balloon/payload system, and the pilot parachute moves around and above the envelope/payload system and eventually the envelope/payload system will exert a force on the pilot parachute such that the main parachute (attached to the pilot chute by the second bridle line) is pulled from the parachute container, which will be clear of the balloon envelope and reduce the possibility of tangling between the main parachute and envelope/payload system. The main parachute will provide a controlled descent of the envelope/payload system.

In one aspect, a balloon system is provided including a balloon envelope, a payload secured to the balloon envelope, a first parachute positioned within a parachute container, the parachute container secured to the payload, a first bridle line having a first end secured to the balloon system and a second end secured to the parachute container, a controller positioned on the balloon system, wherein when the controller receives a signal to deploy the parachute container, the controller is operable to cause the parachute container to be released downwardly from the payload. The parachute container may be launched downwardly at an angle of 0-45, 0-60, or 0-90 degrees from vertical, or simply dropped from the payload upon release.

In a further aspect, a balloon system is provided including a balloon envelope, a payload secured to the balloon envelope, a first parachute positioned within a parachute container, the parachute container secured to the payload, a first bridle line having a first end secured to the balloon system and a second end secured to the parachute container, a controller positioned on the balloon system, wherein the bridle line has a length that is at least 5-20 times the distance between an apex of the balloon envelope and a bottom of the payload, and wherein when the controller receives a signal to deploy the parachute container, the controller is operable to cause the parachute container to be released downwardly from the payload at an angle of 0-90 degrees from vertical. The parachute container may be launched downwardly at an angle of 0-45, 0-60, or 0-90 degrees from vertical, or simply dropped from the payload upon release.

In another aspect, the present embodiments include a method of deploying a parachute system on a balloon system including the steps of (i) providing a balloon system including a balloon envelope, a payload secured to the balloon envelope, a first parachute positioned within a parachute container, the parachute container secured to the payload, a first bridle line having a first end secured to the balloon system and a second end secured to the parachute container, the first bridle line having a length that is 5-20 times the distance between an apex of the balloon envelope and a bottom of the payload; (ii) receiving a signal to deploy the parachute container; and (iii) releasing the parachute container downwardly from the payload at an angle of 0-90 degrees from vertical.

The present also provide means for releasing a parachute container from a payload; means for deploying a parachute such that the parachute deploys when it is above the balloon envelope and payload; means for pulling a drogue parachute from a parachute container; means for launching a drogue parachute from a parachute container; and means for pulling a main parachute from the parachute container.

These as well as other aspects, advantages, and alternatives, will become apparent to those of ordinary skill in the art by reading the following detailed description, with reference where appropriate to the accompanying drawings.

DETAILED DESCRIPTION

Figure 1:
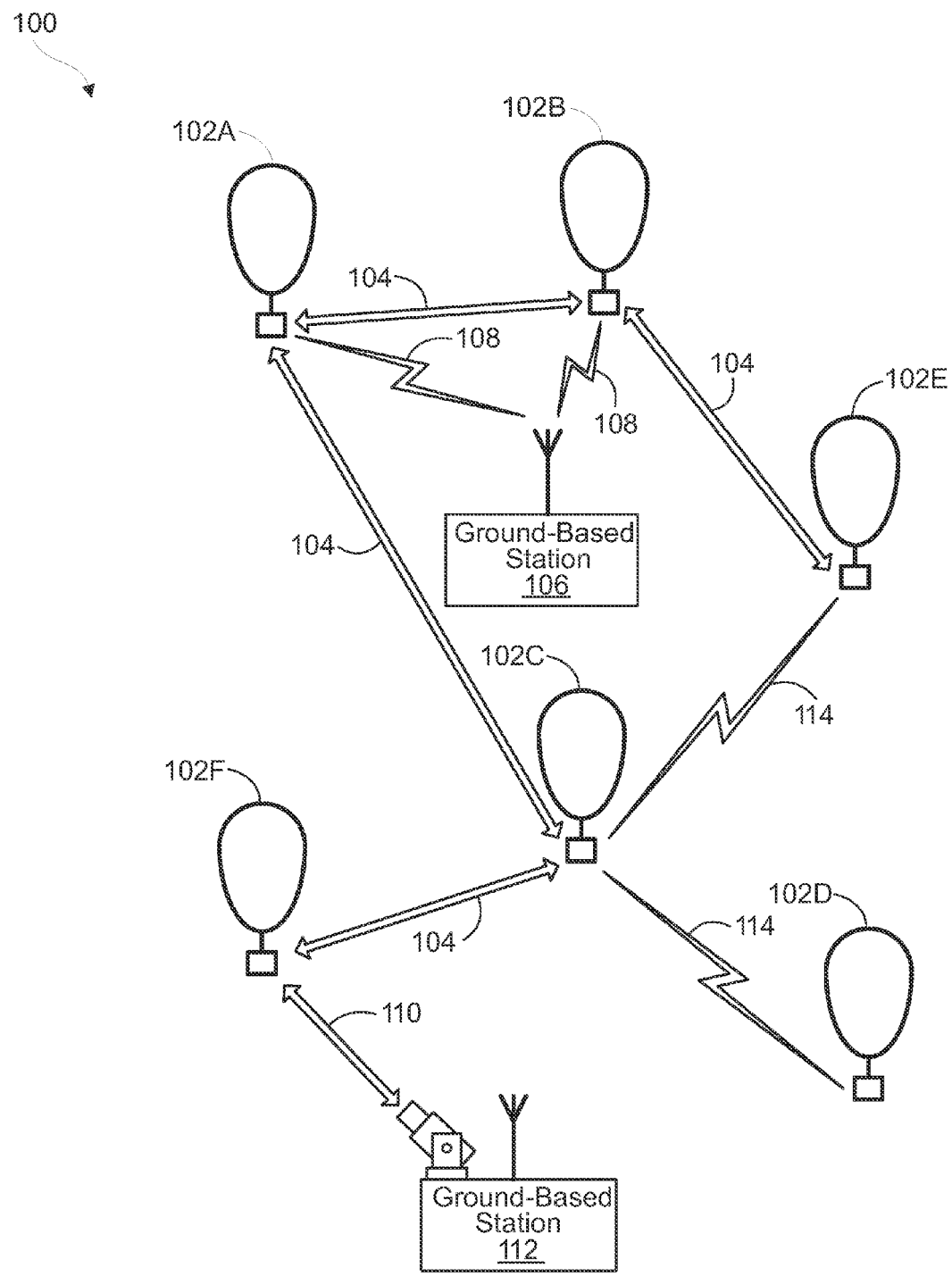
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Example embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations. Note, however, that example embodiments may also relate to a balloon generally, such as to a high-altitude balloon.

Various types of balloon systems may be incorporated in an exemplary balloon network. An exemplary embodiment may utilize high-altitude balloons, which typically operate in an altitude range between 18 km and 25 kilometers. In an exemplary embodiment, such high-altitude balloons may include an envelope, and a payload, along with various other components. Of course, embodiments described herein may also relate to or be implemented in conjunction with other types of balloons as well.

Instruments and electronic equipment may be positioned within a payload that may be used for communication, to record various data and information, and for other reasons. After a period of time, it may be desirable to have the payload return to the surface of the earth to retrieve and/or replace the instruments and electronic devices positioned in the payload. There may be other reasons to bring the payload down to the earth's surface. For example, the balloon payload may be brought down to provide necessary upgrades to the electronic equipment within the payload, to recover and refurbish the electronic equipment for use on later flights, or unexpected events like a balloon leak.

In some instances the payload may be severed and separated from the balloon envelope, and a parachute attached to the payload may be deployed to slow the descent of the payload and to bring the payload safely to the earth. However, given the large number of balloons that may be deployed in the mesh network, it is desirable to bring the payload and the balloon envelope down together to avoid leaving balloon envelope debris detached from the payload, and minimize the cost of recovering two separate systems.

The standard way to bring down the payload and balloon envelope in a controlled manner is to create a hole in the balloon so that the gas vents and the balloon begins to descend. A parachute is deployed from the system to slow the velocity of the descending system. Problems can arise because the balloon film creates a large drag area which causes unpredictable motions as the gas vents. In particular, as the balloon envelope loses gas and thus loses structure and the downward velocity increases, the turbulent flow of the air can cause the balloon envelope to exhibit chaotic motions (e.g., twisting up, whipping around, flipping upside down, etc.) The parachute can become easily tangled in the balloon envelope and not deploy cleanly. Therefore it would be desirable to provide a parachute system that reduces the possibility of having the parachute bridle line become tangled with the balloon envelope, or other parts of envelope/payload system.

The present embodiments provide a parachute system that includes a primary parachute having a very long bridle line that allows for the parachute to be far away from the balloon envelope upon deploying, thereby reducing the possibility of having the bridle line becoming tangled with the balloon envelope, or other parts of the balloon or payload, and increasing the likelihood of a clean deployment. In some embodiments, the bridle line may be on the order of 5-20 times as long as the balloon system length (top of envelope to bottom of payload) or in some embodiments 5-20 times the diameter of the balloon envelope when inflated. In other embodiments, the bridle line may be on the order of 8-10 times as long as the balloon system length (top of envelope to bottom of payload) or in some embodiments 8-10 times the diameter of the balloon envelope when inflated.

In addition, a parachute container containing the primary parachute and the bridle line may advantageously be launched downwardly (at an angle of 0-45, 0-60, or 0-90 degrees from vertical) from the payload to allow the parachute to be far from the balloon envelope upon deployment. Alternately, the parachute system may be secured to the payload, ideally on the bottom of the payload, and rather than being launched, the parachute system may simply be dropped from the payload, by releasing the holding strap(s).

In one embodiment, a drogue or pilot parachute is used. In this embodiment, the main bridle line is positioned within the parachute container, and is attached to the parachute container on one end and to the payload on the other end. When it has been determined that it is time to launch or drop the parachute container, the parachute container is launched or dropped from the payload. As the parachute container descends, the main bridle line is pulled from the parachute container. The main bridle line is attached to the drogue or pilot chute near its end. Once the main bridle line has been pulled out of the parachute container, the drogue or pilot chute is pulled from the parachute container and deployed. The parachute container and main parachute within are suspended beneath the deployed pilot chute by a second bridle line.

As the system velocity of the descending balloon/payload system increases as it loses buoyancy and as cross-sectional drag decreases, the pilot parachute with the main parachute and parachute container suspended below is lifted up, around, and above the envelope/payload system and eventually the balloon/payload system will exert a force on the pilot parachute such that the main parachute (attached to the pilot chute by the second bridle line) is pulled from the parachute container, which will be clear of the balloon envelope and reduce the possibility of tangling between the main parachute and balloon envelope or other parts of the parachute system. The main parachute will provide a controlled descent of the balloon/payload system.

Alternately, there are others methods of pulling the pilot parachute out of the parachute container. For example, the pilot parachute could be placed on a platform on top of a compressed spring, and secured thereto with a strap. When a certain amount of the main bridle line has been pulled out, a pin could be pulled to release the securing strap and the compressed spring would expand to launch the pilot parachute from the parachute container.

By dropping the parachute downwards, and not shooting it upwards, it is much more likely to get away from tangling with the balloon/payload system cleanly especially as there is about 2-10 seconds before the balloon starts to accelerate rapidly downwards after a burst is detected by the parachute triggering system. In addition, the long tether keeps the parachute decoupled from the payload/envelope system spinning and instabilities. Also, the longer the tether, the lower the probability that the drogue/parachute system will crash into the envelope/payload system as the drogue/parachute system is rising above the envelope/payload system. This system also affords better control of the payload orientation during descent, as opposed to mounting it to the top of the balloon envelope. Mounting the parachute container on the payload also removes mass and complexity from the apex of the envelope. In addition, by simply dropping the parachute container, the need for a launch platform (possibly using a compressed spring) is also eliminated reducing mass and components on the envelope/payload system. Further, the drogue parachute may also be given a directional bias (such as by opening a hole in one of the drogue parachute panels) so that it flies out and away from the envelope/payload system as it rises above the envelope/payload system.

The present embodiments may also operate to provide a controlled descent of the payload/balloon envelope system in the event of a burst of the balloon envelope. In particular, pressure sensors or strain gauges on the balloon envelope may be used to monitor the pressure directly or indirectly within the balloon envelope. If there is a loss of pressure of a predetermined amount over a predetermined period of time, then a signal will be provided to launch or drop the parachute container. Alternately, sensors such as an Inertial Measure Unit (IMU) may be used to determine a rate of descent or rate of change in descent. Upon determining that the balloon/payload system has exceeded a predetermined rate of descent or change in rate of descent, a signal will be provided to launch or drop the parachute container.

High-altitude balloons may operate in extreme temperature ranges including extremely cold and extremely high temperatures. Further, a limited amount of power is available. Therefore, a mechanism to launch or drop the parachute container that may reliably operate in such an environment and under such conditions is desirable.

In some embodiments, a squib, or pyrotechnic cutting device may be used to sever a strap used to secure the parachute container to the payload. Upon activation and explosion of the squib, a bolt or strap within the squib device is caused to be severed, thereby releasing the strap used to secure the parachute container. Once the securing strap is severed, the parachute container is launched or dropped from the payload.

Other means for releasing the securing straps may also be used. For example, a nichrome wire could be attached to the strap, which upon activation can heat up and melt the securing strap. Further, an actuated trigger mechanism having opposed pivotable jaws could be used to hold the strap in place. Upon activation, the jaws could be opened, thereby releasing the securing strap. Other devices such as a linear actuator, or rotary actuator could also be used to releasably secure the parachute container prior to launch or drop.

It should be understood that the above examples are provided for illustrative purposes, and should not be construed as limiting. As such, the method additionally or alternatively includes other steps or includes fewer steps, without departing from the scope of the invention.

II. Example Balloon Networks

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-toground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area.

Further, in some embodiments, some or all balloons may be continually moving while at the same time maintaining desired coverage over the ground (e.g., as balloons move out of an area, other balloons move in to take their place). In such an embodiment, a station-keeping process may in fact take the form of fleet-planning process that plans and coordinates the movement of the balloons. Other examples of station-keeping are also possible.

B. Control of Balloons in a Balloon Network

Figure 2:
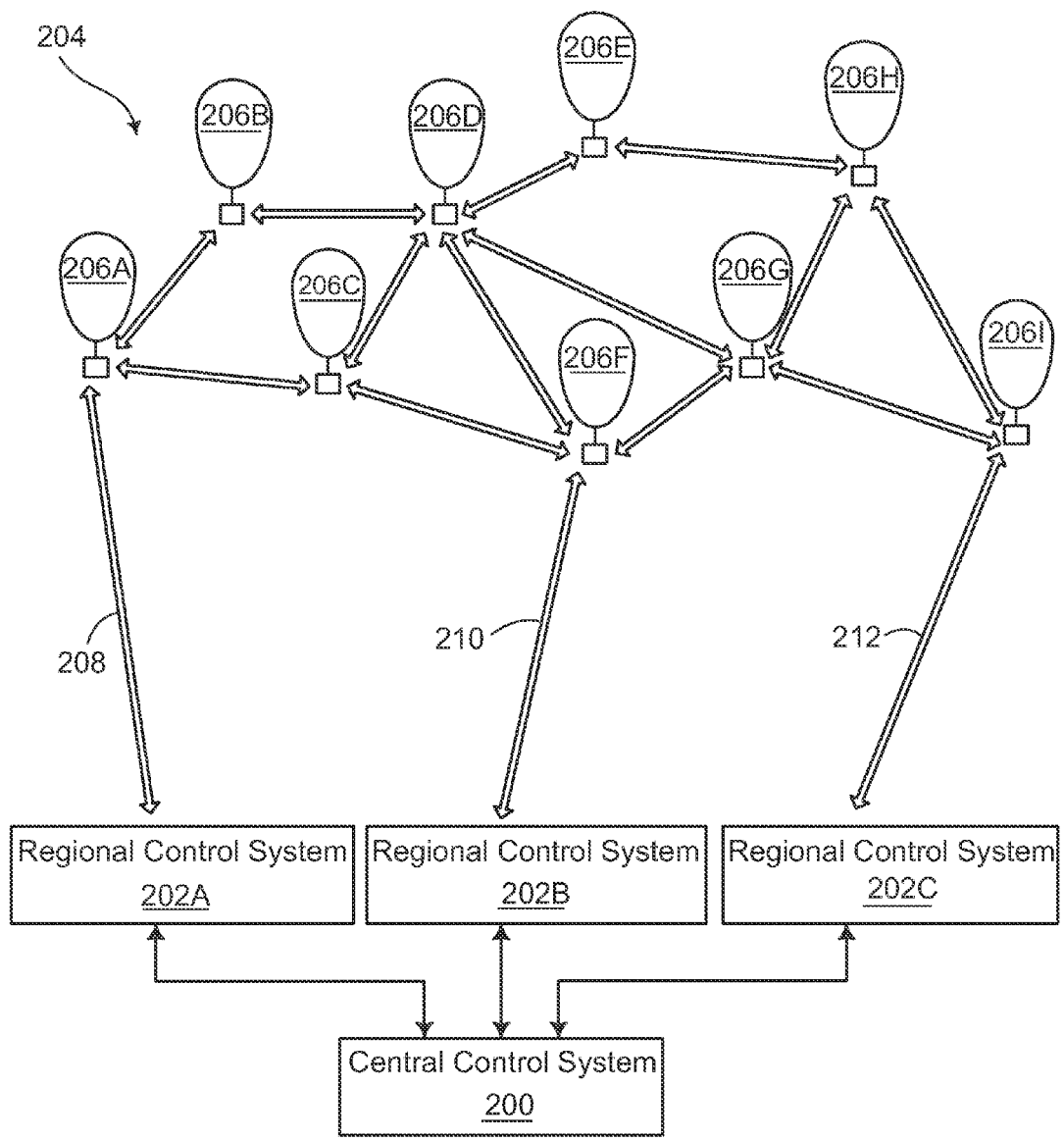
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

Further, control systems such as those described above may determine when and/or where individual balloons should be taken down. Additionally, the control systems may navigate the balloons to locations where they are to be taken down. The control systems may also cause the balloons to be taken down, and may control their descent and/or otherwise facilitate their descent.

III. Exemplary Balloon Configuration

Figure 3:
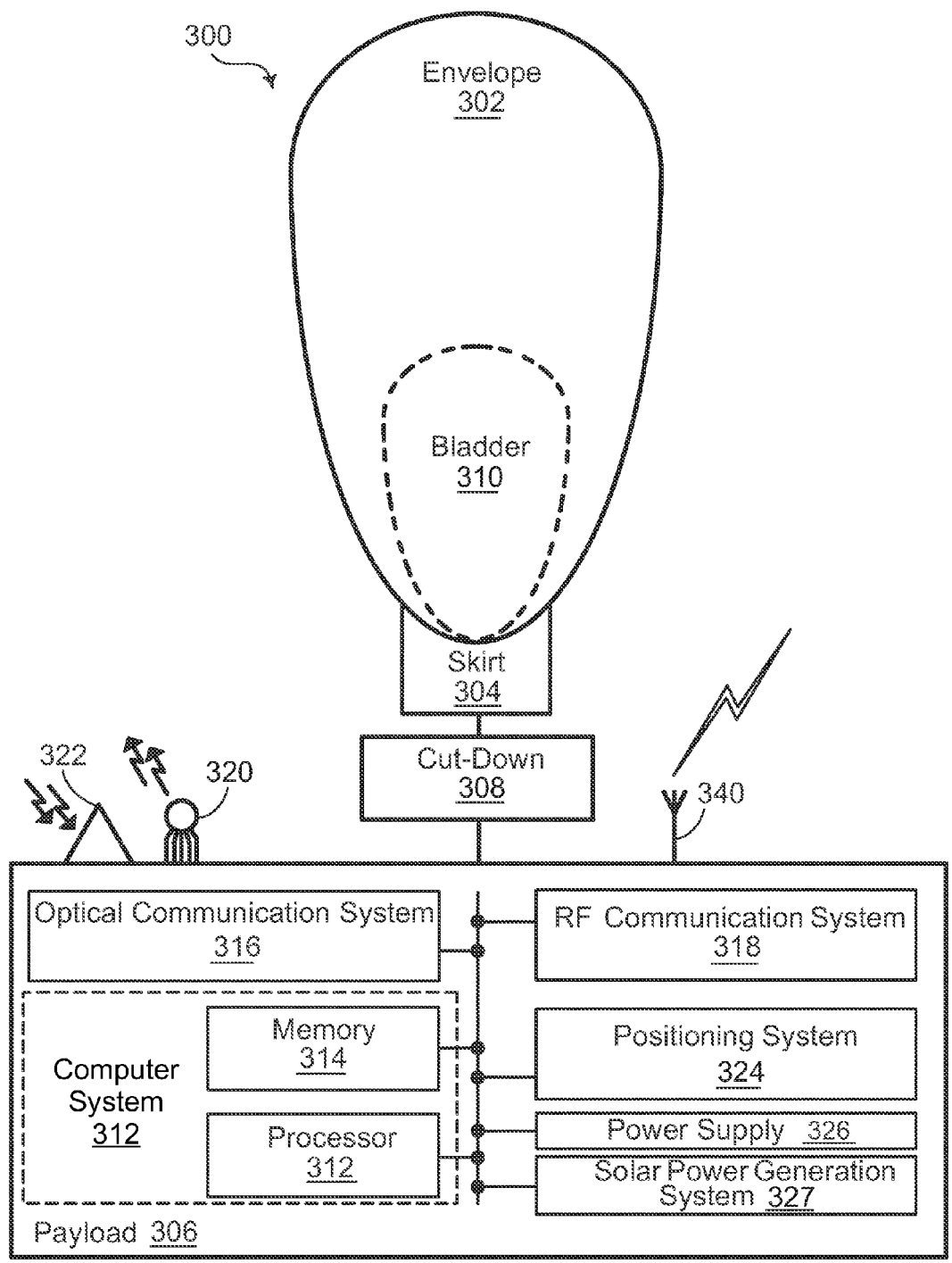
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down device 308, which is attached between the balloon 302 and payload 306.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a computer system 312, which may include a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down device 308. The cut-down device 308 may be activated to separate the payload 306 from the rest of balloon 300. The cut-down device 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced. Note that in an example embodiment, the cut-down device 308 may be used in conjunction with a parachute system. However, it should be understood that a cut-down device 308 is optional.

In an alternative arrangement, a balloon may not include a cut-down device. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft. In yet another embodiment, the balloon may include a parachute system configured to enable the balloon 300 and payload 306 to descend safely to the ground.

IV. Example Parachute System

The present embodiments provide a parachute system that includes a primary parachute having a very long bridle line that allows for the parachute to be far away from the balloon envelope upon deploying, thereby reducing the possibility of having the bridle line becoming tangled with the balloon envelope, or other parts of the envelope/payload system and increasing the likelihood of a clean deployment. Typical bridle line lengths are from 1-2 times the inflated diameter of a balloon envelope, and longer lines typically are viewed as causing more potential for tangling because there is more line, and also the drawback of adding additional weight to the envelope/payload system. However, the present embodiments depart from the conventional approach of having a bridle line length of 1-2 times the diameter of the inflated balloon envelope, and instead provide a much longer bridle line.

In some embodiments, the bridle line may be on the order of 5-20 times as long as the balloon system length (top of envelope to bottom of payload) or in some embodiments 5-20 times the diameter of the balloon envelope when inflated. In some embodiments, the bridle line may be on the order of 8-10 times as long as the balloon system length (top of envelope to bottom of payload) or in some embodiments 8-10 times the diameter of the balloon envelope when inflated.

In addition, a parachute container containing the primary parachute and the bridle line may advantageously be launched downwardly (e.g., at an angle of 0-45, 0-60, or 0-90 degrees from vertical) from the payload to allow the parachute to be far from the balloon envelope upon deployment. Alternately, the parachute system may be secured to the payload, ideally on the bottom of the payload, and rather than being launched, the parachute system may simply be dropped from the payload, by releasing the holding strap(s).

Figures 4A, 4B:
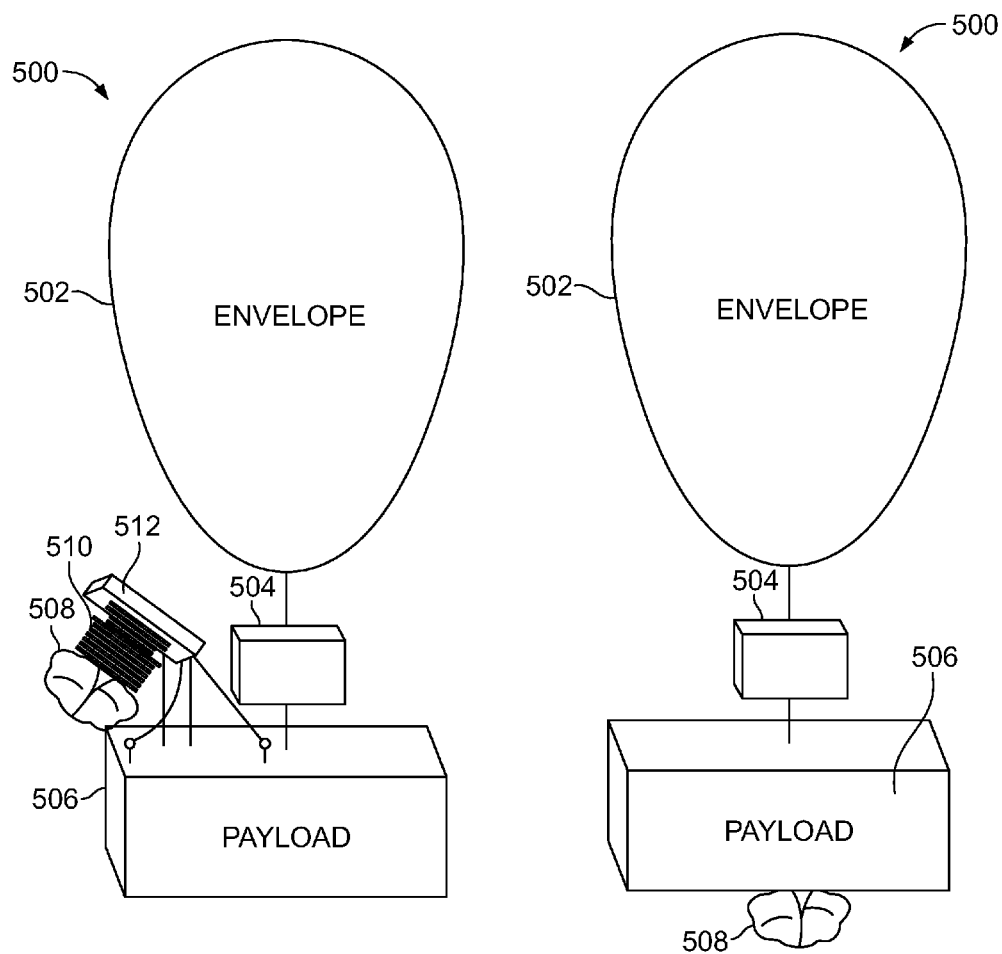
FIG. 4A illustrates an example parachute deployment system prior to downwardly launching the parachute container 508.
FIG. 4B illustrates an example parachute deployment system prior to during downwardly dropping the parachute container 508.

FIG. 4A illustrates an example balloon system 500 having a balloon envelope 502 and payload 506 prior to the downward launch of parachute container 508. A cut-down mechanism 504 is included in the event the payload 506 needs to be severed from the balloon envelope 502. In this embodiment, the parachute container 508 is secured to the payload 506 and positioned over a launch platform 512 and a compressed spring 510. The launch panel is angled to launch the parachute container 508 downwardly at a 45 degree angle from vertical. The launch platform may be positioned on the top or side of the payload, at the top of the envelope 502, or in another location. However, it is desirable (but not required) to provide the parachute container on the payload, to clear mass and complexity from the apex of the balloon envelope 502. Other types of launches may be also used, such as a catapult, etc. Other launch angles are also possible, including a launch angle of 0-45 degrees, or 0-60, or 0-90 degrees. However, a 45 degree launch angle allows the parachute container to be launched away from being underneath the balloon envelope, such that when the main parachute deploys, it is less likely to inflate in the path of the descending envelope/payload system and therefore less likely to become tangled with the balloon envelope or other parts of the envelope/payload system.

It is also desirable to launch the parachute container 508 downwardly so that the bridle line within the parachute container is pulled fully from the parachute container 508 more quickly. After a hole is cut into the balloon envelope, the balloon generally retains its altitude for 8 or more seconds before descending. As a result, relative winds may cause the envelope/payload system to drift away from the parachute container or inflated parachute.

As noted above, the parachute system may include a very long bridle line (see FIG. 5), e.g. 5-20, or 8-10 times the envelope/payload system length, which advantageously provides a greater distance between the envelope/payload system and the main parachute and reduces the chance of the bridle line becoming tangled with the balloon envelope or other parts of the envelope/payload system. In addition, even if there some tangling of the bridle line at its lower portions, the tangling is unlikely to adversely affect the main parachute from functioning properly.

FIG. 4B illustrates an example parachute deployment system prior to downwardly dropping the parachute container 508. When using a very long bridle line (e.g. 5-20 or 8-10 times the length of the envelope/payload system), it has been determined that launching the parachute container 508 is not necessary, and the parachute container 508 may be simply released from the payload. As shown in FIG. 4B, the parachute container 508 is secured beneath the payload 506. Upon release, the parachute container 508 simply drops beneath the envelope/payload system. After a hole is cut into the balloon envelope, the balloon generally retains its altitude for 8 or more seconds before descending. As a result, as in the case of a downward launch, relative winds may cause the envelope/payload system to drift away from the parachute container 508 or inflated parachute even when the parachute container 508 is not launched from the payload 506.

The parachute container 508 shown in FIGS. 4A and 4B is releasably secured to the payload 506. In one scenario, when it is determined to have the envelope/payload system 500 return to the ground, a signal is sent to the envelope/payload system 500 to initiate a release of lift gas from the balloon envelope 502. Upon receiving a signal from the ground, airborne vehicle, or another balloon, a cutting device or other method may be used to provide a controlled venting of the lift gas. In a second scenario, when the balloon envelope undergoes an unexpected burst, pressure sensors or strain gauges on the balloon envelope 502 may be used to monitor the pressure directly or indirectly within the balloon envelope 502. If there is a loss of pressure of a predetermined amount possibly over a predetermined period of time, then a signal will be provided to launch or drop the parachute container. Alternately, sensors such as an Inertial Measurement Unit (IMU) may be used to determine a rate of descent or change in rate of descent. Upon determining that the balloon/payload system has exceeded a predetermined rate of descent or change in rate of descent, a signal may be provided to launch or drop the parachute container 508.

A variety of release mechanism may be used to release a line or strap securing the parachute container 508, and launch (or drop) the parachute container. For example, the release mechanism may include a squib, an explosive bolt, or a shearing mechanism, as examples. In another example, the release mechanism may include a nichrome wire wrapped around the strap or line. The nichrome wire may be configured to receive a current and generate heat, thereby melting the strap or line. Other release mechanisms are possible as well. For example, an actuated trigger mechanism having opposed pivotable jaws could be used to hold the strap in place. Upon activation, the jaws could be opened, thereby releasing the securing strap. Other devices such as a linear actuator, or rotary actuator could also be used to releasably secure the parachute container prior to launch or drop.

Figure 5A:
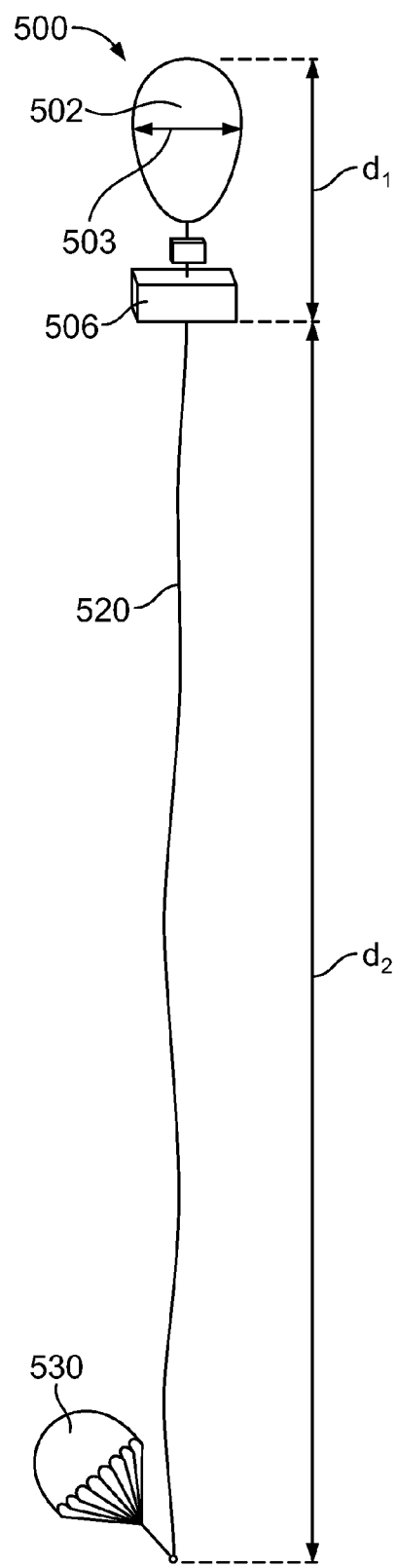
FIG. 5A illustrates the very long length of bridle line 520 extending between payload 506 and main parachute 530.

FIG. 5A illustrates the very long length of bridle line 520 extending between payload 506 and main parachute 530. In particular, the bridle line 520 may have a length $d_2$ that is at least 5 times greater than the length $d_1$ of the envelope/payload system 500, and in some embodiments may be 8-10, or even 20 times the length $d_1$ of the envelope/payload system 500. As discussed above, having a bridle line of this very long length advantageously provides a parachute system that is less likely to become tangled with the balloon envelope or other parts of the envelope/payload during descent. Depending on the application and size of the envelope/payload system, the bridle line may have a length of 50-200 meters. For example, if the length $d_1$ of the envelope/payload system is 10 meters, then the length $d_2$ of the bridle line 520 may be 50-200 meters or more, and in other embodiments 80-100 meters, and in one embodiment is 75 meters. In other embodiments, the length $d_2$ may be more than 5-20 times the length of a maximum diameter 503 of balloon envelope 502 when inflated, e.g. 5-20 times the length of the maximum diameter 503, or more, and in other embodiments may be 8-10 times the length of a maximum diameter 503 of balloon envelope 502 when inflated.

Figure 6A:
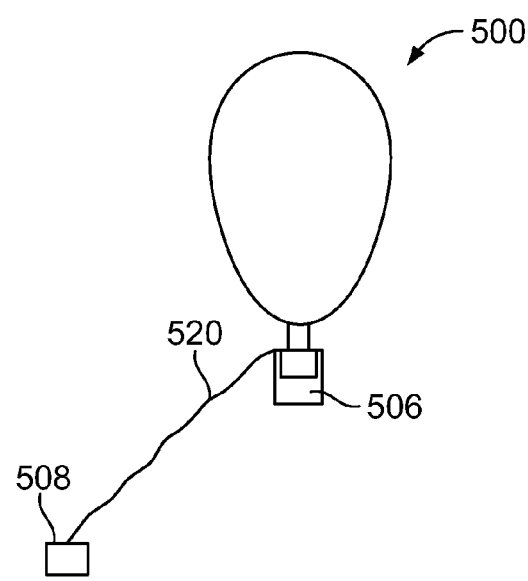
FIG. 6A illustrates parachute container 508 after being downwardly released from the payload 506.

FIG. 6A illustrates parachute container 508 after being downwardly released from the payload 506. In this embodiment, a drogue or pilot parachute is used. In this embodiment, the main bridle line 520 is positioned within the parachute container 508, and is attached to the parachute container 508 on one end and to the payload 506 or other part of the envelope/payload system on the other end. When it has been determined that it is time to launch or drop the parachute container 508, the parachute container 508 is launched or dropped from the payload 506 as shown in FIG. 6A.

Figure 6B:
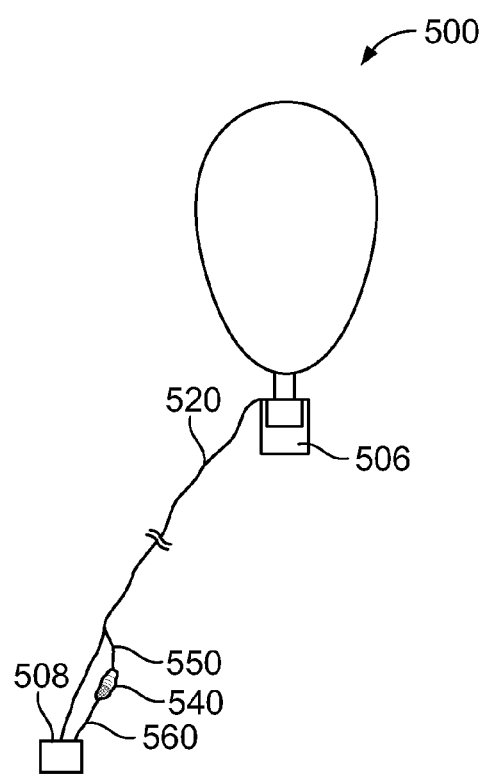
FIG. 6B illustrates drogue parachute 540 being pulled from parachute container 508 after the bridle line 520 has been nearly pulled all the way of the parachute container 508.

As shown in FIG. 6B, as the parachute container 508 further descends, the main bridle line 520 is pulled from the parachute container 508. The main bridle line 520 is attached to the drogue or pilot chute 540 near the end of the bridle line 520. Once the main bridle line 520 has been pulled out of the parachute container 508, the drogue or pilot chute 540 is pulled from the parachute container 508. In this embodiment, the drogue parachute 540 is pulled from the parachute container 508 by a static line 550 attached to the main bridle line 520. The drogue parachute 540 is in turn attached to a main parachute positioned within the parachute container 508. In other embodiments, the main bridle line 520 may be attached directly to the drogue parachute 540. Further, in other embodiments, a drogue parachute may not be used, and the bridle line may be connected directly to a main parachute positioned within the parachute container.

Figure 6C:
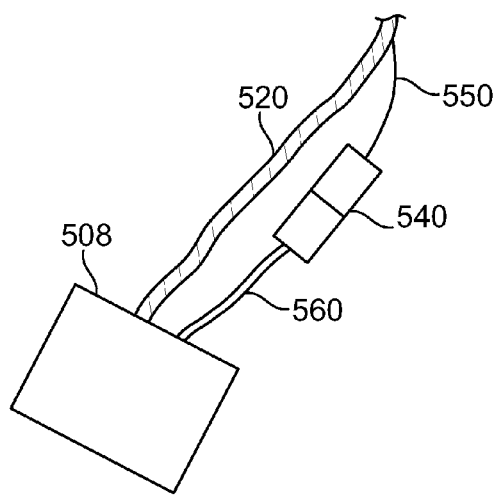
FIG. 6C provides a close up view of the parachute container 508 shown in FIG. 6B illustrating drogue parachute 540 being pulled from parachute container 508 by static line 550 attached to the bridle line 520.

FIG. 6C provides a close up view of the parachute container 508 shown in FIG. 6B illustrating drogue parachute 540 being pulled from parachute container 508 by static line 550 attached to the bridle line 520. The static line 550 should be strong enough to pull the drogue parachute 540 from the parachute container 508. The static line 550 may be comprised of a cotton thread that is adapted to break once the drogue parachute 540 is inflated. The drogue parachute 540 is attached to the main parachute within the parachute container 508 by second bridle line 560.

Figure 6D:
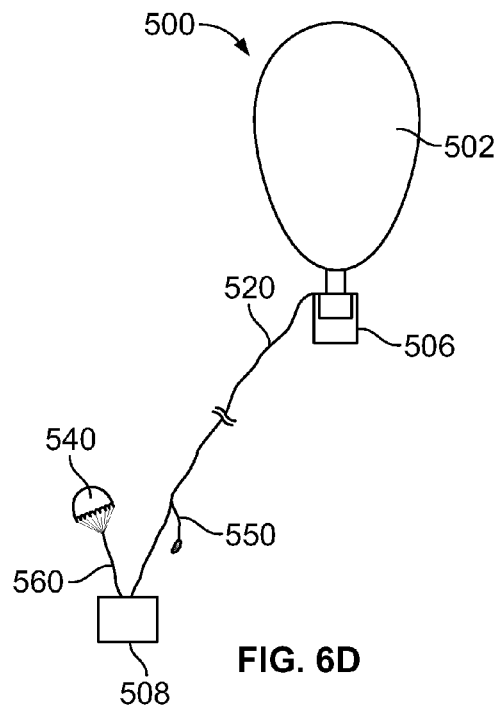
FIG. 6D illustrates deployment of drogue parachute 540 after it has been pulled out of the parachute container by static line 550, which breaks once the drogue parachute has been pulled from the parachute container.

FIG. 6D illustrates deployment of drogue parachute 540 after it has been pulled out of the parachute container 508 by static line 550, which has broken once the drogue parachute 540 has filled with air. The parachute container 508 and main parachute within are suspended beneath the deployed pilot chute 540 by the second bridle line 560. Alternately, there are other methods of pulling the pilot parachute 540. For example, the pilot parachute 540 could be placed on a platform on top of a compressed spring, and secured thereto with a strap. When a certain amount of the main bridle line 520 has been pulled out, a pin could be pulled to release the securing strap and the compressed spring would expand to launch the pilot parachute 540 from the parachute container 508.

Figure 6E:
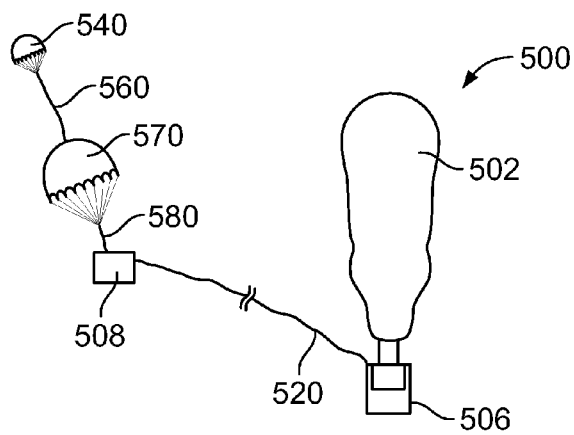
FIG. 6E illustrates balloon system 500 after the drogue parachute 508 has pulled main parachute 570 out of the parachute container 508, and the main parachute 570 has been pulled up, around, and above the balloon envelope 502.

FIG. 6E illustrates balloon system 500 after the drogue parachute 508 has pulled main parachute 570 out of the parachute container 508, and the main parachute 570 has been inflated and pulled up, around, and above the balloon envelope 502. As the system velocity of the descending balloon/payload system 500 increases as it loses buoyancy as the balloon envelope 502 deflates and the cross sectional drag of the balloon envelope is reduced, the pilot parachute 540 with the main parachute 570 and parachute container 508 suspended below is lifted up, around, and above the envelope/payload system 500 and eventually the balloon/payload system 500 will exert a force on the pilot parachute 540 such that the main parachute 570 (attached to the pilot chute by the second bridle line 560) is pulled from the parachute container 508, which will be clear of the balloon envelope 502 and reduce the possibility of tangling between the main parachute 570 and balloon envelope 502 and other parts of the envelope/payload system 500. The main parachute 570 is attached to the parachute container 508 with bridle line 580.

Figure 6F:
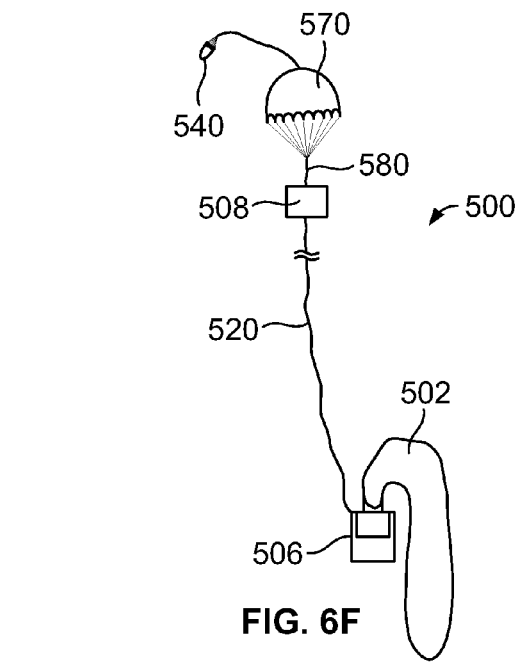
FIG. 6F illustrates main parachute 570 providing a controlled descent of balloon envelope 502 and payload 506 extending beneath the main parachute 570.

FIG. 6F illustrates main parachute 570 providing a controlled descent of balloon envelope 502 and payload 506 extending beneath the main parachute 570. The main parachute 570 is positioned well above the envelope/payload system 500 so as to reduce potential tangling between the main bridle line 520 and the balloon envelope 502 or payload 506. Some tangling of the bridle line with the envelope/payload system 500 may be tolerated because given the lengthy bridle line it will unlikely affect the operation of the main parachute 570 because the tangling is so far away. For the same reason the main parachute 570 is decoupled from any spinning or instabilities of the envelope/payload system 500.

The bridle line may 520 may be made of nylon, polyester, or some other suitable material such as ultra high molecular weight polyethylene or high molecular weight polyethylene (HMPE). In one embodiment the balloon envelope may be 12 meters in diameter and have an envelope/payload system length of 10 meters and use a bridle line that is 75 meters long. The drogue parachute 540 may have a size of 2 square meters and may have a diameter of 50-60 meters. The main parachute 570 may have a size of 5 square meters.

Figure 7A:
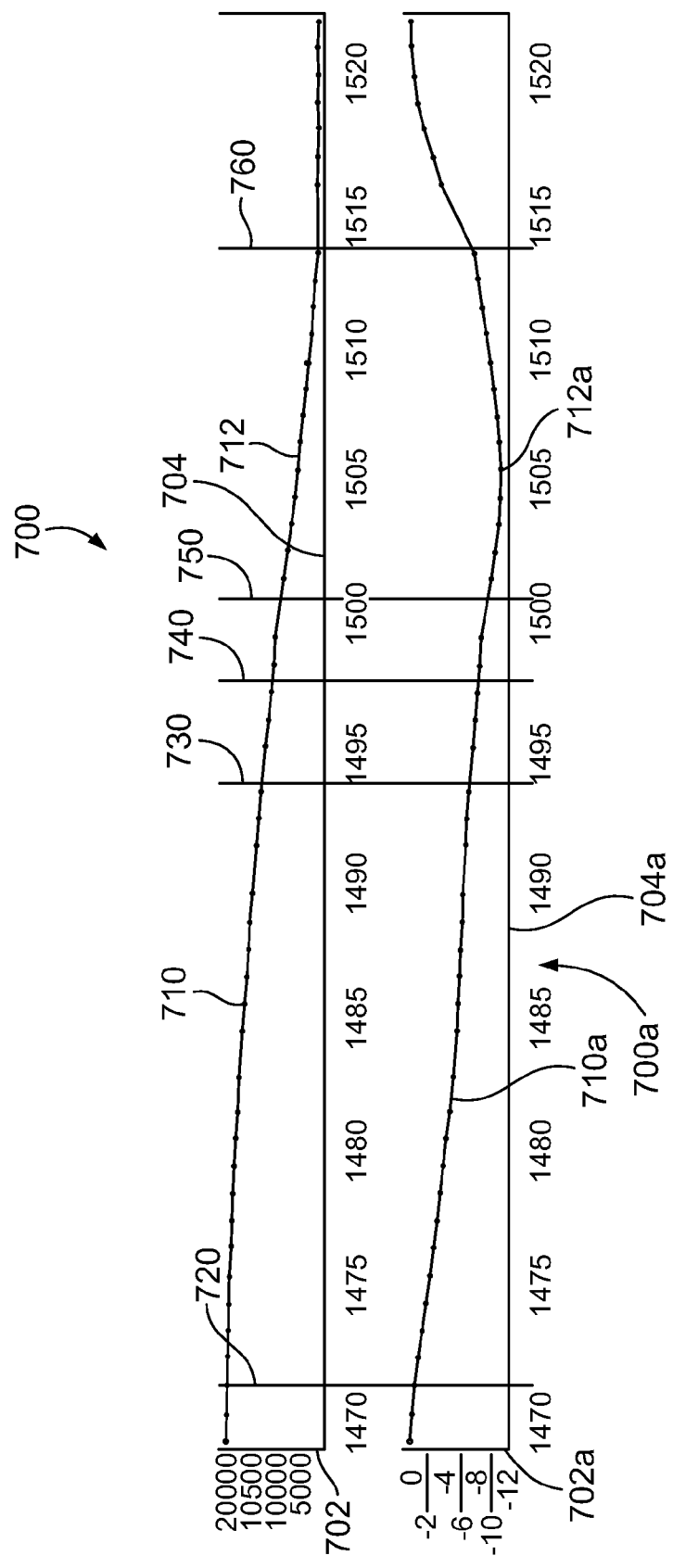
FIG. 7A is a pair of graphs 700 and 700a with plotted line 710 showing altitude versus time of an envelope/payload system, showing a hard cutdown at time line 720, parachute container launch at time line 730, deployment of drogue parachute at time line 740, main parachute deployment at time line 750 and landing at time line 760; the lower graph 700a includes plotted line 710a showing vertical velocity of the same envelope/payload system shown in graph 700.

FIG. 7A is a pair of graphs 700 and 700a with plotted line 710 plotting altitude 702 versus time 704 of an envelope/payload system, showing an intentional hard cutdown at time line 720, parachute container launch at time line 730, deployment of drogue parachute at time line 740, main parachute deployment at time line 750 and landing at time line 760. In the case of an intentional cutdown as illustrated in graph 700, the parachute container is retained on the envelope/container system for much longer (than the in the case of a unexpected burst) to wait until the envelope/payload system velocity and atmospheric density have increased so that when the drogue is pulled out, it catches immediately. As shown by line portion 712, the main parachute provides for a controlled descent of the envelope/payload system until landing at time line 760.

The lower graph 700a shown in FIG. 7A includes plotted line 710a plotting vertical velocity 702a versus time 704a for the same envelope/payload system shown in graph 700. In graph 700a the negative values for the vertical velocity mean that the envelope/payload system is moving downward. After cutdown at time lines 720, the envelope/payload system slowly picks up speed to about −1 lm/s at line portion 712a and then slows down to about −8 m/s at landing impact at time line 760.

Figure 7B:
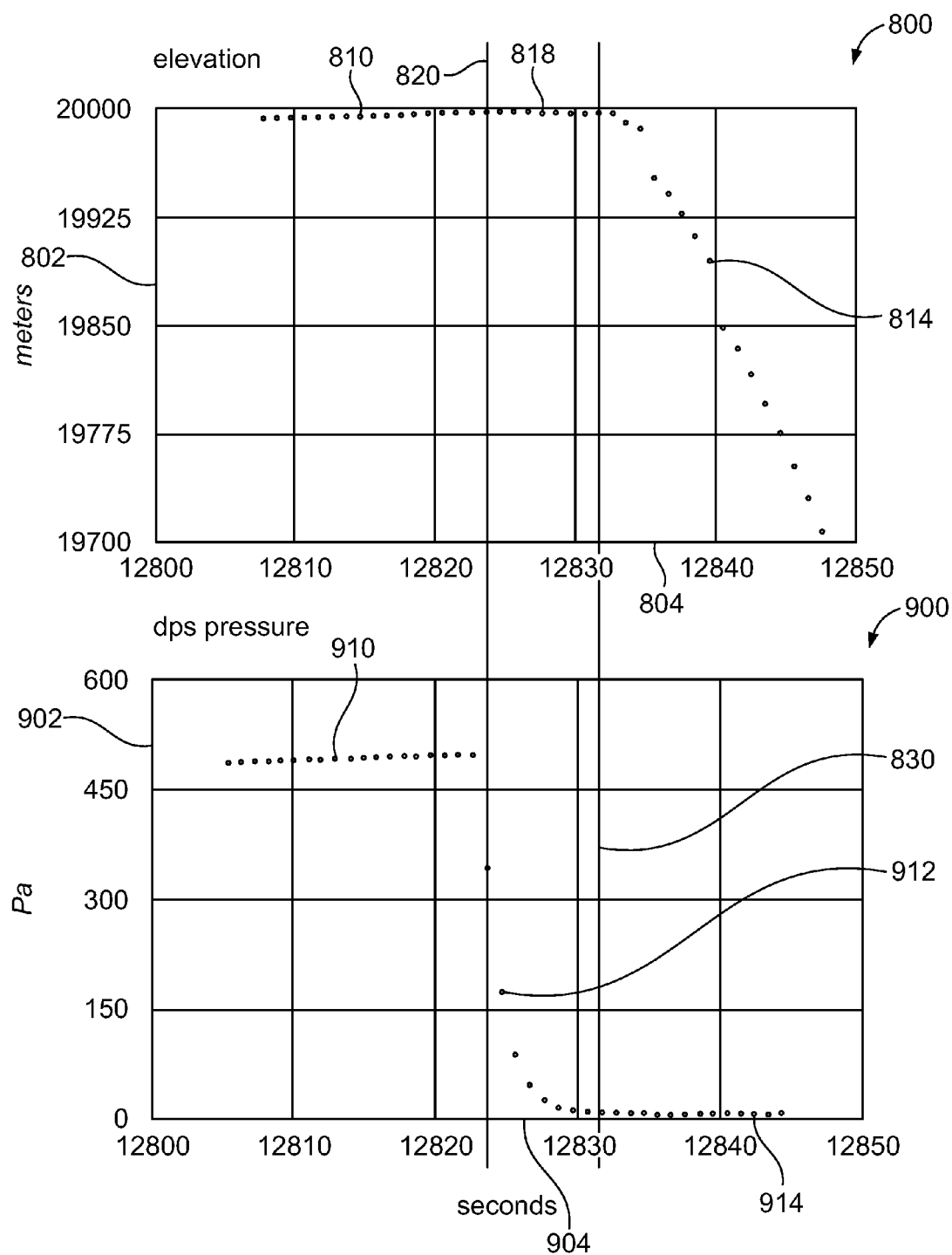
FIG. 7B is a pair of graphs with top graph 800 plotting altitude versus time of an envelope/payload system showing a burst detection at time line 820, and the envelope/payload system beginning an accelerated descent at line 830; and with lower graph 900 plotting the pressure within the balloon envelope versus time using the same time line as shown in the upper graph 800.

FIG. 7B is a pair graphs with top graph 800 plotting altitude 802 versus time 804 of an envelope/payload system shown with plotted line 810 showing a burst detection at time line 820, where the balloon generally maintains altitude (as shown by line portion 818) for around 8 seconds, until rapid descent occurs at time line 830 (as shown by line portion 814). Lower graph 900 records the same event with plotted line 910, except with plotting the pressure 902 within the balloon envelope versus time 904 using the same time line as shown in the upper graph 800 with plotted line 910. A burst detection occurs at time line 820, and line portion 912 illustrates a rapid reduction in pressure within the balloon envelope, ultimately falling to 0 at line portion 914. Graphs 800 and 900 illustrate that the envelope/payload system will maintain altitude even in the case of a burst such that there is enough time for the bridle line and drogue parachute to be pulled from the parachute container when using a very long bridle line, and enough time to simply drop the parachute from the payload without launching it. In particular the parachute container would be dropped less than a second after the burst detection at line 820 and it takes less than 8 seconds for the parachute container to reach the end of its very long bridle line.

Figure 7C:
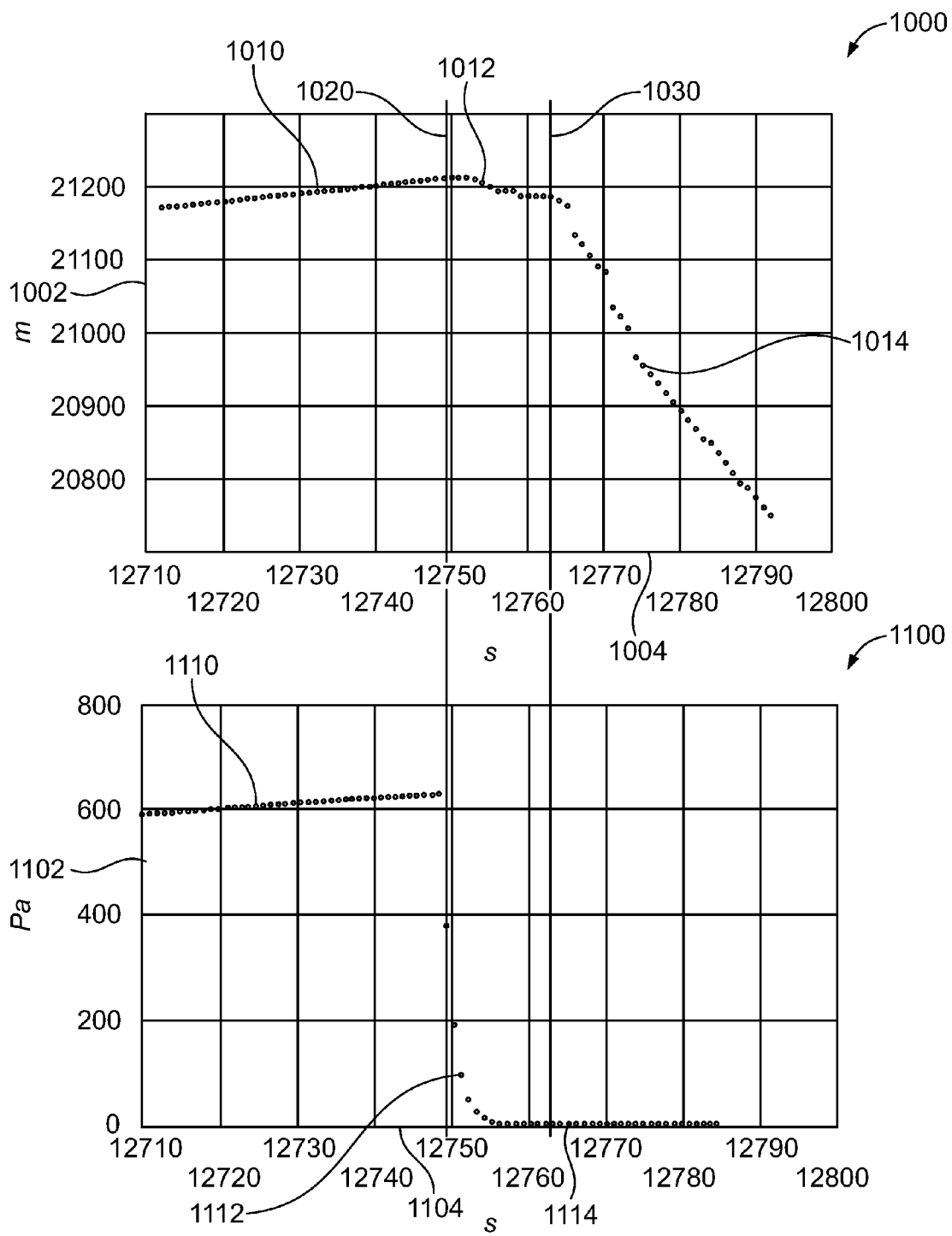
FIG. 7C is a pair graphs with top graph 1000 plotting altitude versus time of an envelope/payload system showing a burst detection at time line 1020, and the envelope/payload system beginning an accelerated descent at line 1030; and with lower graph 1100 plotting the pressure within the balloon envelope versus time using the same time line as shown in the upper graph 1000.

FIG. 7C is a pair graphs with top graph 1000 plotting altitude 1002 versus time 1004 of an envelope/payload system shown with plotted line 1010 showing a burst detection at time line 1020, where the envelope/payload system generally maintains altitude for around 12 seconds (as shown by line portion 1012), and then beginning an accelerated descent at time line 1030 (as shown by line portion 1014). Lower graph 1100 records the same event plotting the pressure 1102 within the balloon envelope versus time 1114 using the same time line as shown in the upper graph 1000 with plotted line 1110. A burst detection occurs at time line 1020, and line portion 1112 illustrates a rapid reduction in pressure within the balloon envelope, ultimately falling to 0 at line portion 1114. Graphs 1000 and 1100 illustrate that the envelope/payload system will maintain altitude even in the case of a burst such that there is enough time for the bridle line and drogue parachute to be pulled from the parachute container when using a very long bridle line, and enough time to simply drop the parachute from the payload without launching it.

The present embodiments may advantageously combine the use of a very long bridle line on the order of 5-20 times the envelope/payload system length together with the downward launching or dropping of the parachute container. By launching or dropping the parachute container downwards, and not shooting it upwards (e.g., with a spring or rocket), it is much more likely to get away from tangling with the balloon/payload system cleanly especially as there is about 8-12 seconds before the balloon starts to descend after a burst detection. In addition, the long tether keeps the parachute decoupled from the payload/envelope system spinning and instabilities. This system also affords better control of the payload orientation during descent, as opposed to mounting it to the top of the balloon envelope. Mounting the parachute container on the payload also removes mass and complexity from the apex of the envelope. In addition, by simply dropping the parachute container, the need for a launch platform (possibly using a compressed spring) is also eliminated reducing mass and components on the envelope/payload system.

V. Examples of Methods

Figure 8:
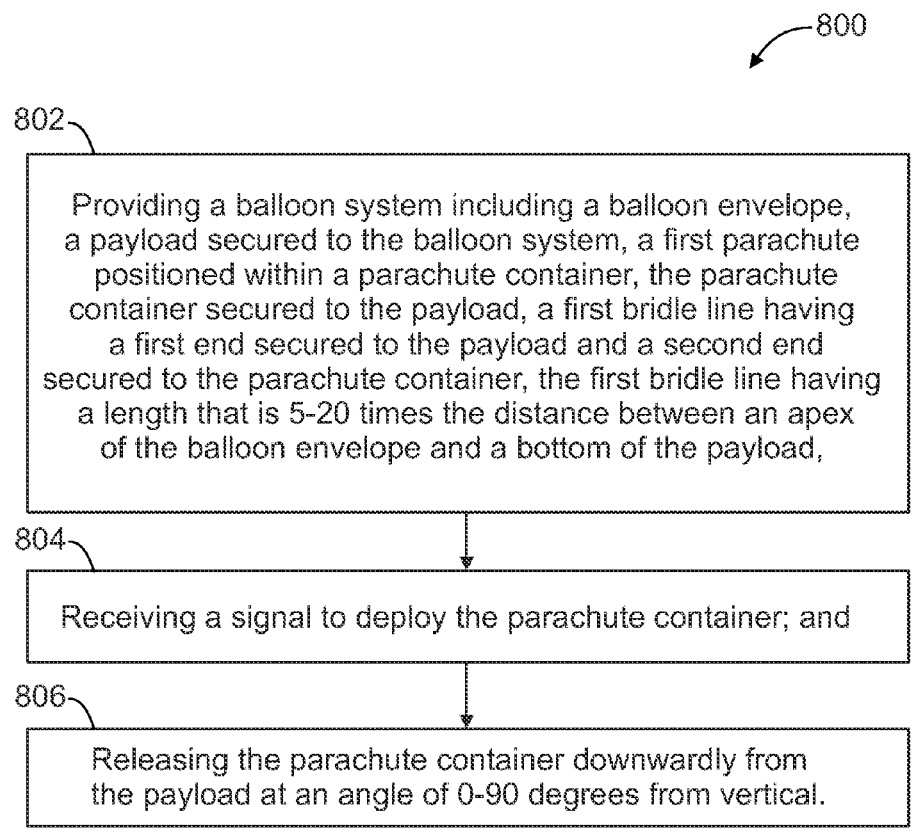
FIG. 8 is a method, according to an example embodiment.

FIG. 8 is a simplified flow chart illustrating a method 800 of deploying a parachute system on a balloon system. Method 800 includes the step 802 of providing a balloon system including a balloon envelope, a payload secured to the balloon system, a first parachute positioned within a parachute container, the parachute container secured to the payload, a first bridle line having a first end secured to the balloon system and a second end secured to the parachute container, the first bridle line having a length that is 5-20 times the distance between an apex of the balloon envelope and a bottom of the payload, the step 804 of receiving a signal to deploy the parachute container; and the step 806 of releasing the parachute container downwardly from the payload at an angle of 0-90 degrees from vertical.

VI. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A balloon system comprising:
   a balloon envelope;
   a payload secured to the balloon envelope;
   a first parachute positioned within a parachute container, the parachute container secured to the payload;
   a first bridle line having a first end secured to the balloon system and a second end secured to the parachute container;
   a controller positioned on the balloon system;
   wherein when the controller receives a signal to deploy the parachute container, the controller is operable to cause the parachute container to be released downwardly from the payload; and
   wherein the signal to deploy the parachute container is based on sensed change in pressure within the balloon envelope.

2. The balloon system of claim 1, wherein the first bridle line has a length that is 5-20 times the distance between an apex of the balloon envelope and a bottom of the payload.

3. The balloon system of claim 2, wherein the first bridle line has a length that is 8-10 times the distance between the apex of the balloon envelope and the bottom of the payload.

4. The balloon system of claim 1, wherein the parachute container is secured to a bottom of the payload and dropped downwardly upon release.

5. The balloon system of claim 1, wherein the parachute container is secured over a launch platform secured to the payload and directed to launch the parachute container downwardly at an angle of 0-90 degrees from vertical; and
   wherein upon release of the parachute container, the parachute container is launched downwardly from the launch platform.

6. The balloon system of claim 5, wherein the launch platform is directed to launch the parachute container downwardly at an angle of 0-45 degrees from vertical.

7. A balloon system comprising:
   a balloon envelope;
   a payload secured to the balloon envelope;
   a first parachute positioned within a parachute container, the parachute container secured to the payload;
   a first bridle line having a first end secured to the balloon system and a second end secured to the parachute container;
   a controller positioned on the balloon system;
   wherein when the controller receives a signal to deploy the parachute container, the controller is operable to cause the parachute container to be released downwardly from the payload; and
   wherein the first parachute is a drogue parachute attached to a second main parachute with a second bridle line.

8. The balloon system of claim 7, wherein the second main parachute is drawn out of the parachute container by the drogue parachute during the descent of the payload and balloon envelope.

9. The balloon system of claim 7, wherein the drogue parachute is secured over a launch platform in the parachute container positioned over a compressed spring, and a static line secured to the first bridle line is adapted to release the drogue parachute at a predetermined distance beneath the payload.

10. A balloon system comprising:
    a balloon envelope;
    a payload secured to the balloon envelope;
    a first parachute positioned within a parachute container, the parachute container secured to the payload;
    a first bridle line having a first end secured to the balloon system and a second end secured to the parachute container;
    a controller positioned on the balloon system;
    wherein when the controller receives a signal to deploy the parachute container, the controller is operable to cause the parachute container to be released downwardly from the payload; and
    wherein the signal to deploy the parachute container is based on a measured rate of descent or a measured change in the rate of descent of the payload.

11. A balloon system comprising:
    a balloon envelope having a maximum diameter when inflated;
    a payload secured to the balloon envelope;
    a first parachute positioned within a parachute container, the parachute container secured to the payload;
    a first bridle line having a first end secured to the balloon system and a second end secured to the parachute container;
    a controller positioned on the balloon system;
    wherein the bridle line has a length that is 5-20 times the distance between an apex of the balloon envelope and a bottom of the payload;
    wherein when the controller receives a signal to deploy the parachute container, the controller is operable to cause the parachute container to be released downwardly from the payload at an angle of 0-90 degrees from vertical; and
    wherein the first parachute is a drogue parachute attached to a second main parachute with a second bridle line.

12. The balloon system of claim 11, wherein the parachute container is secured to a bottom of the payload, and drops downwardly upon release.

13. The balloon system of claim 11, wherein the parachute container is secured over a launch platform secured to the payload and directed to launch the parachute container downwardly at an angle of 0-45 degrees from vertical; and wherein upon release of the parachute container, the parachute container is launched downwardly from the launch platform at an angle of 0-45 degrees from vertical.

14. The balloon system of claim 11, wherein the drogue parachute is secured over a launch platform in the parachute container positioned over a compressed spring, and a static line secured to the first bridle line is adapted to release the drogue parachute at a predetermined distance beneath the payload.

15. A method of deploying a parachute system on a balloon system comprising:
provBottomProviding a balloon system including a balloon envelope, a payload secured to the balloon system, a first parachute positioned within a parachute container, the parachute container secured to the payload, a first bridle line having a first end secured to the balloon system and a second end secured to the parachute container, the first bridle line having a length that is 5-20 times the distance between an apex of the balloon envelope and a bottom of the payload;
receiving a signal to deploy the parachute container;
releasing the parachute container downwardly from the payload at an angle of 0-90 degrees from vertical; and
wherein the signal to deploy the parachute container is based on a measured rate of descent or a measured change in the rate of descent of the payload.

16. The method of claim 15, wherein the first parachute is a drogue parachute attached to a second main parachute with a second bridle line.

17. The method of claim 15, wherein the signal to deploy the parachute container is also based on sensed change in pressure within the balloon envelope.

18. A method of deploying a parachute system on a balloon system comprising:
providing a balloon system including a balloon envelope, a payload secured to the balloon system, a first parachute positioned within a parachute container, the parachute container secured over a launch platform secured to the payload and directed to launch the parachute container downwardly at an angle of 0-45 degrees from vertical, a first bridle line having a first end secured to the balloon system and a second end secured to the parachute container, the first bridle line having a length that is 5-20 times the distance between an apex of the balloon envelope and a bottom of the payload;
receiving a signal to deploy the parachute container based on sensed change in pressure within the balloon envelope; and
launching the parachute container downwardly from the launch platform at an angle of 0-45 degrees from vertical.

* * * * *